March 31, 1970  G. W. ICKE  3,503,361

VEHICULAR SPEED WARNING METHOD AND MEANS

Filed Jan. 6, 1967

GEORGE W. ICKE
INVENTOR

BY *Keith Schoff*
ATTORNEY

United States Patent Office 3,503,361
Patented Mar. 31, 1970

3,503,361
VEHICULAR SPEED WARNING METHOD AND
MEANS
George W. Icke, 111 Gerry Court,
Madison, Wis. 53715
Filed Jan. 6, 1967, Ser. No. 607,710
Int. Cl. G08b
U.S. Cl. 116—63                                        8 Claims

ABSTRACT OF THE DISCLOSURE

A stationary vehicle speed and/or directional warning device embodying a plurality of luminous or reflecting means disposed to project narrowly confined beams of light into a path of vehicle travel to be intercepted by a moving vehicle at intervals so as to appear as a single continuous beam if the speed of the moving vehicle equals or exceeds warning speed, and otherwise to appear as discrete beams.

---

This invention relates to a speed warning method and means for communicating to occupants of a moving vehicle information relating vehicle speed to control speed by the manner in which emitted or reflected light beams appear to the vehicle occupants, i.e., if the speed of the vehicle equals or exceeds a predetermined control speed, the light beams appear continuous, but otherwise intermittent. More particularly, the means of this invention provides discrete, essentially parallel beams of light emanating as emitted or reflected radiation with intermediate spacing between the discrete beams substantially equal to the distance traveled by the vehicle at the control speed during an elapsed period of time which is equal to the average period of image retention of the retina of the human eye. The visual effect produced as seen by occupants of a vehicle is similar to that produced by projection of a motion picture, wherein discrete beams of light are projected consecutively at suitable time intervals to appear as a continuous beam, i.e. at a time interval not less than about $\frac{1}{16}$ second, but as a flickering or intermittent beam if the time interval is greater.

Heretofore, transient images have been projected at a rate which produces the illusion of image continuity to a stationary observer as in apparatus for video and motion picture projection, for example, but it has not been known to employ for useful purpose phenomena similarly occurring as a result of a transient observer being transported past a series of discrete light beams at a rate which produces the illusion of continuity of the light beams to the observer.

It is an object of this invention to provide a speed warning method and means for communicating intelligence to occupants of a moving vehicle of the relationship between instantaneous vehicle speed and a pre-determined control speed.

It is another object of this invention to provide a method and means for communicating intelligence to moving vehicle occupants of vehicle speed without requiring diversion of the visual attention of the vehicle occupants from the field of view of approaching travel of the vehicle.

It is another object of this invention to provide a method for communicating intelligence of vehicle speed to occupants of a moving vehicle by means passively responsive to vehicle passage.

Other objects will become apparent from the following description and included drawings wherein like numbers refer to like parts and wherein.

Figure 1:
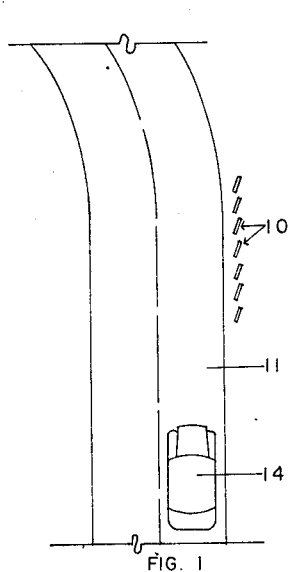
FIGURE 1 is a schematic view of an embodiment of this invention installed adjacent a roadway upon which a vehicle is shown operatively disposed with respect to the embodiment.
Figure 2:
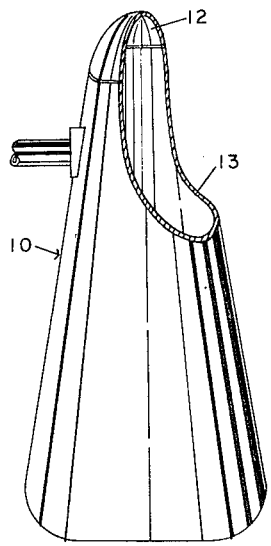
FIGURE 2 is a partial cutaway view of one of the means of the embodiment of FIGURE 1.

In FIGURE 1 members 10 are shown aligned adjacent the side of roadway 11 at substantially uniform intervals. A member 10 may comprise optical reflector 12 (FIGURE 2) which preferably is of parabolic configuration with shield 13 attached thereto for confining a beam of light reflected from reflector 12 to a narrow radial angle in a horizontal plane, but not to as narrow of an angle in a vertical plane. Thus, a beam emanating from member 10 or reflected from reflector 12 will be confined by the substantially uniform transverse dimension of shield 13 to consist of essentially parallel rays in a horizontal plane, but not be confined in a vertical plane because shield 13 is configured with proportionally increasing vertical dimension along the longitudinal axis thereof from reflector 12 to the opposite end extremity thereof. The configuration of shield 13 causes a light beam from a member 10 to be confined so that at the point of interception thereof by vehicle 14 on roadway 11, it will appear to a vehicle occupant as a discrete beam non-convergent with light beams from other of members 10, but divergent in a vertical plane thereby enabling a vehicle occupant to operably view each such beam regardless of the elevation of the occupant in the vehicle. The combination of axial length of shield 13 parallel to the optical axis of a beam emanating from member 10 such as from reflector 12, and the horizontal dimension of shield 13 transverse to the optical axis will determine for a beam of non-coherent light the radial arc to which the beam will be confined in a horizontal plane. The inside surface of shield 13 is preferably non-reflecting and for that purpose a non-reflecting black matte finish on the inside surface of shield 13 may be provided such as is commonly used in photographic equipment to absorb stray reflected light. Shield 13 need be only of such dimensions of length and width as will be necessary to render a particular light beam which is emitted or reflected by a member 10 non-convergent with other of such light beams and to be spaced apart from next adjacent of such beams by a distance which is a function of the control speed to be indicated. Thus, if a control speed of 60 miles per hour is to be indicated, the intermediate distance between the beam extremities, i.e. between the least mutually distant rays of next adjacent beams, will be equal to the distance traveled by the vehicle at the control speed (88 feet per second) during the average image retention period for the retina of the human eye ($\frac{1}{16}$ second) or 5.5 feet as measured along the path of travel of the vehicle.

If, for example, at the path of vehicle travel the beams from members 10 are the same width as the distances between next adjacent beams, then the spacing between next adjacent beams, then the spacing between next adjacent members 10 will be the sum of 5.5 feet plus 5.5 feet or 11 feet measured parallel to roadway 11. If the beam widths at the path of vehicle travel are greater than the distances intermediate next adjacent beams, then the spacing between next adjacent members 10 will be proportionally greater, and conversely, if the beam widths as projected at the path of travel of vehicle 14 are less than the intermediate projected spacing therebetween, the spacing between members 10 will be proportionally less, limited however, by a condition of non-divergence of the beams for which the spacing of next adjacent members 10 parallel to the path of travel of vehicle 14 on roadway 11 will be equal to the distance between beams plus the projected width of the non-divergent beam.

It is preferred when reflectors 12 are employed in members 10 to provide a relatively small acute angle between the optical axis of a beam from member 10 and the path of travel of vehicle 14 to enable the most strongly lighted portion of the headlamp beam, i.e. the center portion of the headlamp beam, to be reflected by members 10 thereby producing sharply defined beam reflections and more central positioning of the beam reflection than peripheral within the forward vision of a vehicle occupant.

Figure 4:
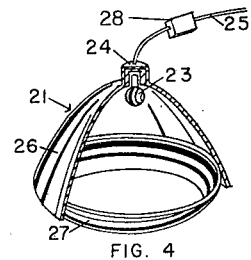
FIGURE 4 is an elevation in partial cutaway of a lamp means for use as a light source in embodiments of this invention.
Figures 3, 5, 6:
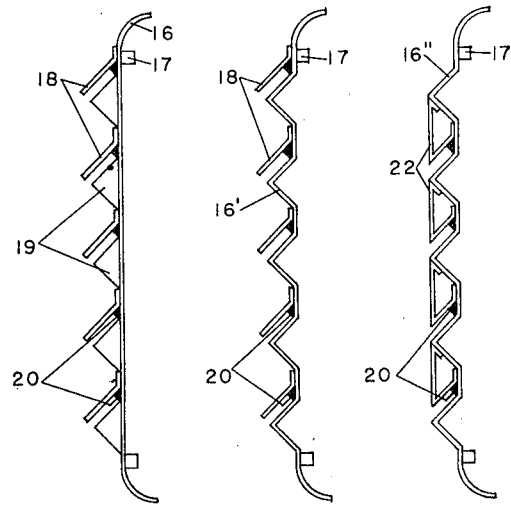
FIGURE 3 is a plan view of an embodiment of this invention installed on a highway guard rail.
FIGURE 5 is a plan view of another guard rail installation incorporating means of this invention.
FIGURE 6 is a plan view of another guard rail installation incorporating means of this invention.

In FIGURE 3 another embodiment of this invention is shown wherein posts 17 support guard rail 16 comprising metal cable, rigid metal plates, or other conventional means. Shield plates 18 are fixed to rail 16 to extend obliquely therefrom as shown, and wedge shaped shield blocks 19 are fixed to rail 16 in alternate arrangement with shield plates 18, thereby providing slot shaped shielded openings between shield plates 18 and shield blocks 19 through which light beams can be reflected or can emanate as shown. Light source 20 is operably mounted on rail 16 between shield plates 18 and shield blocks 19 and may comprise reflector means such as reflector 12 and/or lamp 21 as shown in FIGURE 4. Other operable reflecting or illuminating means may be employed as desired. The disposition of the reflecting means and shielding means of FIGURE 3 may be similar to that above described with respect to FIGURE 1. Rail 16 may be replaced by rail means configured to provide as integral portions thereof shield blocks 19, shown as rail 16' in FIGURE 5, or both shield plates 18 and shield blocks 19, shown as rail 16" in FIGURE 6, thereby reducing or eliminating fabrication requirements necessary to provide embodiments of this invention.

In FIGURE 6, rail 16" is shown with weldment 22, but rail means may be configured to incorporate the form of weldment 22 and eliminate the need for a weldment as will be obvious to a person skilled in the art.

In FIGURE 4, lamp 21 is shown which comprises electric light 23, socket 24, power leads 25, reflector 26 and focusing lens system 27. Lamp 21 as shown is of conventional construction and may be connected to time controlled switching means 28 for causing the lamp circuit to be operably switched on an off at predetermined intervals and for predetermined times. However, means 28 is not required for operable use of the embodiments of the invention hereinbefore described, but may be desirable to conserve electricity use during intervals in traffic flow. Lamp 21 and reflector 12 may be interchanged in embodiments of this invention, or may be combined with reflector 12 replacing reflector 26 in lamp 21, or lens 27 may be employed in FIGURE 4 as a reflector in the manner of reflector 12 of FIGURE 1. It is within the scope of this invention to employ reflective illumination means such as glass lens, mirror reflectors, reflective paints, reflective pressure sensitive tapes or other common expedients such as are commonly used in vehicular road signs. It is within the scope of this invention to provide both reflective and illuminated means or either alone for use in embodiments herein described.

The spacing of next adjacent reflective or illuminating means, such as members 10 in FIGURE 1 or members 20 in FIGURES 3, 5 and 6, desirably will be equal when uniform control speed is to be indicated and will be varied progressively when acceleration or deceleration control in speed is to be indicated, as for example, in an approach to a curve or bounding a speed control zone. It is within the scope of this invention to provide lasers as embodiments of members 10 in FIGURE 1 of this invention, thereby replacing and eliminating the need for the reflecting and shielding configurations of members 10, or correspondingly to provide lasers for use in FIGURES 3, 5 and 6 embodiments thereby replacing and eliminating members 20, shield plates 18 and shield blocks 19. Lasers when used in this invention also eliminate the need for focusing means such as focusing lens system 27 of FIGURE 4. Coherent light as emitted by a laser consists of parallel rays of a single wavelength, and therefore the light does not require focusing because the rays of the beam are parallel as emitted, and also are monochromatic so that beam definition is independent of the refractive index of the transmission medium. When lasers are employed in a means of this invention, it is preferred to cause the laser beam to be oriented in a plane which intersects with the plane of the road surface, thereby being visible to occupants of all vehicles regardless of the elevation of such occupants above the road surface. Lasers may be disposed in substantially identical manner to that shown for members 10 of FIGURE 1 or may be remotely disposed from roadside as far as may reasonably be desired without affecting utility of the means. Lasers are well known and do not constitute invention herein.

Figure 7:
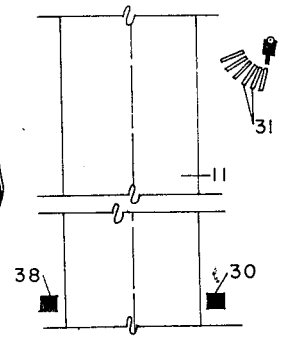
FIGURE 7 is a schematic plan view of another embodiment of this invention installed adjacent a paved surface such as an airport runway or a highway.

In FIGURE 7 is shown another embodiment of this invention wherein photo-electric cell 30 is disposed to be responsive to interruption of a light beam directed thereto-ward by lamp 38 disposed on the opposite side of roadway 11. When a vehicle passing along roadway 11 intercepts the beam from lamp 38, light source means 31 as may be provided are actuated and by time delay means may be energized and operably lighted for the period of time that it takes the vehicle, if traveling at the control speed indicated, to pass an installation comprising an embodiment of this invention. Light source 31 may be pulsed at a frequency which is equal to or greater than that necessary to insure that a beam therefrom will be visible to the occupant of a vehicle while the occupant is passing through the beam. Thus, a beam which is about one inch in diameter will be pulsed at approximately a rate of one millisecond to indicate a control speed of 60 miles per hour. Each light source 31 may be lighted successively to provide the illusion of beam continuity to a vehicle occupant. Thus, assuming the conditions in the example described relative to FIGURE 1, successive light sources 31 may be lighted at $\frac{1}{16}$ second intervals when the distance between beams as projected on the path of vehicle travel is 5.5 feet. Light sources 31 which may conveniently be lasers are shown radially extending from a single point, which may be the pivot point of a single energizing, illuminating, or reflecting means. The provision of lasers and of energizing means and mountings therefor are conventional and constitute no part of this invention.

Figure 8:
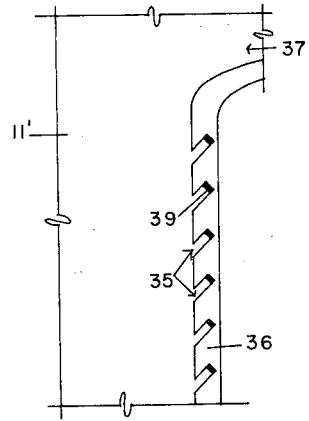
FIGURE 8 is a plan view of a curb incorporating an embodiment of this invention.

In another embodiment of this invention shown in FIGURE 8, a plurality of reflectors 35 are disposed in alignment at curb 36 near exit 37 from road 11'. Reflectors 35 preferably comprise luminescent strips or phosphorescent stripes, which are preferably disposed at low elevation so as to be below the headlight beam immediately ahead of a vehicle but visible in the light of a turn indicator signal lamp. Thus, to communicate to a vehicle occupant a safe approach speed to exit 37, reflectors 35 will appear in the light of a turn indicator lamp, which is operated at a rate to provide a sustained light beam for a period in excess of 1/16 second, as plural discrete images during the dwell time while the turn indicator lamp is lighted if the vehicle is traveling at a speed less than the control speed to be indicated, and as continuous non-discrete images of a multiple number of stripes 39 if the vehicle speed exceeds the control speed. Reflectors 35 may be shielded in the manner described hereinbefore for other embodiments of this invention, and preferably are disposed in recesses in curb 36. Such recesses may be integrally provided in curb 36 with the inventive means being completed by the addition of reflective stripes 39 in the recesses.

The angular aspect with which the reflective maens and recesses are set in the curb will determine in part the function of the inventive means, whether for reflecting a light beam from a head lamp or from a directional turn indicator lamp. The disposition of the reflective means and recessing of the curb will be apparent to one skilled in the art as will placing such recesses in a highway surface or guard rail.

Embodiments of this invention can be used to communicate information to occupants of transport means other than automobiles, such as for example, to occupants of watercraft such as hydrofoil vessels, or of aircraft. The FIGURE 7 embodiment of this invention may be preferred for use in applications where it may be necessary to provide inventive means incorporating a light source at relatively great distances from a vehicle, as for example for use by an airplane in a landing approach. A beam from an embodiment of this invention as shown in FIGURE 7 may be directed toward an aircraft approaching for landing to establish relative speed as hereinbefore described and also to establish glide angle of the beam of the FIGURE 7 embodiment is caused to oscillate in a vertical plane or project a divergent beam to provide a vertically oriented wedge shaped light beam which will visibly establish maximum and minimum elevation for the glide path. If an oscillatory motion of the light beam is used, each oscillation would be accomplished during a time interval less than required for the craft to pass through the beam i.e. at an oscillatory frequency of the order of 150,000 cycles per second for a laser with a one inch diameter beam for use with aircraft approaching at speeds to 200 miles per hour. The provision of oscillatory means or means for providing a divergent beam will be within the ability of one skilled in the art and may be accomplished for example respectively, by providing a plane reflecting crystal or mirror in the path of the emitted beam and oscillating the crystal or mirror at radio frequency or by similarly providing a slightly convexly curvilinear reflecting surface of a reflective crystal or mirror in the path of an emitted beam to produce beam diversion in a vertical plane. It will also be within the ability of one skilled in the art to provide means, such as electronic, mechanical, or stepping switch means, for effecting successively energization of the plurality of means of FIGURE 7 so that a single illuminating or reflecting means biased to progressive angular aspects will provide an equivalent effect to that produced by multiple numbers of similar means being fixed to each member 3 at different angular aspects to a vehicular path of travel. The means of this invention as shown in FIGURE 1 may also be employed in conjunction with airport runways, particularly to communicate knowledge of relative aircraft speed to pilots of aircraft during takeoff.

The average image retention period of the human eye is given hereinbefore as about 1/16 second, however it is to be understood that the range of from about 1/12 second to 1/24 second image retention is generally applicable to human vision and embodiments of this invention may be designed upon the basis of retention periods within such range.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. A speed warning device stationarily disposed to be visible to occupants of a moving transport means for indicating speed of travel relative to pre-determined control speed comprising in combination
    (a) a plurality of luminous optical means visible to said occupants who are disposed substantially coincident with the optical axes of said means,
    (b) each said means being configured to provide substantially parallel rays of light,
    (c) optical axes of beams comprising said rays being mutually non-intersecting,
    (d) each said means being disposed apart from next adjacent said means to provide intermediate next adjacent light beams therefrom at points of interception of said beams with the path of transport means travel a distance along said path substantially equal to the distance traveled during an elapsed time of substantially from about 1/12 second to 1/24 second at the said control speed, said beams being operably visible to provide the appearance of a continuous light beam to occupants of said transport traveling at not less than the said control speed, and as an intermittent beam when at the said control speed, said beams being operably visible to provide the appearance of a continuous light beam to occupants of said transport traveling at not less than the said control speed, and as an intermittent beam when traveling at lesser speed.

2. The device of claim 1 wherein said luminous optical means comprises a light emitter.

3. The device of claim 1 wherein said luminous optical means comprises a light reflector.

4. Passively operative vehicular speed warning device stationarily disposed to be visible in the forward view of occupants of a moving vehicle for indicating vehicle speed relative to a pre-determined control speed comprising in combination,
    (a) a plurality of luminous optical means aligned along a roadway and visible to occupants of a vehicle operably approaching said means in their normal forward view,
    (b) each said means being configured to provide a directional beam of visible light non-convergent with another of said beams wherein the optical axis of each said beam is substantially parallel with the optical axis of each other of said beams and wherein each said beam is visible consecutively and non-concurrently with another said beam by a vehicle occupant,
    (c) each said means being disposed apart from next adjacent said means to provide intermediate said beams next adjacent at points of interception of said beams with a lane of travel on said roadway a distance measured parallel to said lane of travel on said roadway substantially equal to the distance traveled during an elapsed time of substantially from about 1/12 to 1/24 second at the warning speed to be indicated, the optical axes of said beams being directed obliquely toward the path of travel of a vehicle to which said means is to be operably visible to provide the appearance of a continuous light beam to occupants of a vehicle traveling at not less than a warning speed to be indicated and as a result of a finite time of retention of light beam images on the retinas of the eyes of the occupants of the vehicle.

5. The article of claim 4, wherein said distance between beams is about 0.092 feet for each mile per hour of warning speed to be indicated.

6. The article of claim 4 wherein said reflector is provided with a reflective surface of substantially parabolic cross-sectional configuration.

7. The article of claim 4 wherein said light beam is interrupted not substantially less than about 12 to 24 times per second.

8. The article of claim 4 wherein said means comprises shielding confining said light beam.

References Cited
UNITED STATES PATENTS

| | | | |
|---|---|---|---|
| 1,868,597 | 7/1932 | Eldredge | 88—14 |
| 2,783,730 | 3/1957 | Robins | 116—63 |
| 2,827,561 | 3/1958 | Kennedy | 240—1.2 |
| 2,942,853 | 6/1960 | Glaros | 94—1.5 XR |
| 3,355,999 | 12/1967 | Rusling | 94—1.5 |

LOUIS J. CAPOZI, Primary Examiner